F. H. BUBLITZ.
BICYCLE.
APPLICATION FILED JAN. 15, 1919.
1,304,450.
Patented May 20, 1919.
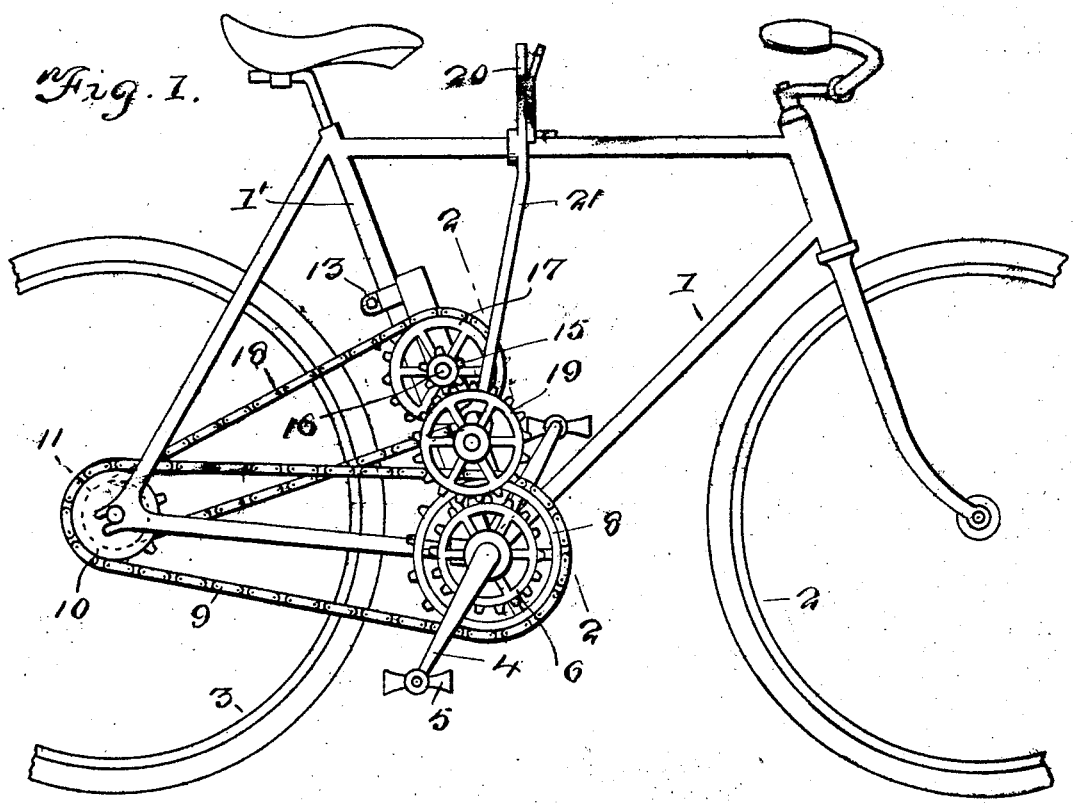
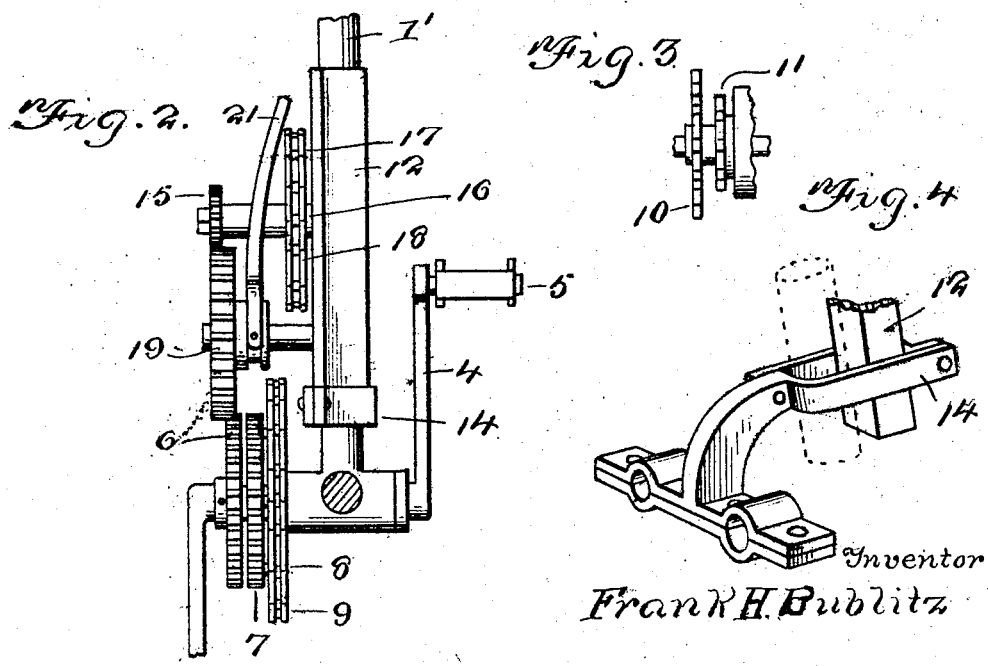
Inventor
Frank H. Bublitz
By Victor J. Evans
Attorney

UNITED STATES PATENT OFFICE.

FRANK HERMAN BUBLITZ, OF CHICAGO, ILLINOIS.

BICYCLE.

1,304,450.

Specification of Letters Patent.

Patented May 20, 1919.

Application filed January 15, 1918. Serial No. 271,343.

*To all whom it may concern:*

Be it known that I, FRANK H. BUBLITZ, a citizen of the United States, residing at Chicago, in the county of Cook and State of Illinois, have invented new and useful Improvements in Bicycles, of which the following is a specification.

This invention relates to a novel construction of propeller means for bicycles and the like, and the principal object of the invention is to provide means for driving the bicycle at different speeds, so that the cyclist may shift to a lower gear in climbing hills or riding against the wind.

Another object of the invention is to provide a simple arrangement of parts for connecting the gears to the frame of the bicycle.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a bicycle supplied with my invention.

Fig. 2 is a section on line 2—2 of Fig. 1.

Fig. 3 is a detail view showing the arrangement of the gears on the hub of the rear wheel.

Fig. 4 is a detail showing the manner of attaching the lower part of the gear supporting member to the frame of the bicycle.

In these views 1 indicates the frame of the bicycle, 2 the front wheels and 3 the rear wheels. 4 indicates the crank to which the pedals 5 are connected. This crank carries a toothed wheel 6 which is secured thereto and a toothed wheel 7 loosely mounted thereon. This wheel 7 is connected with a chain wheel 8. A chain 9 passes from the wheel 8 to a chain wheel 10 carried by the hub of the rear wheel. A small chain wheel 11 is also connected with said hub. An angle bar 12 is secured to the upright member 1' of the frame by means of the clip 13 encircling said member and engaging with the upper end of said bar and the clips 14 engaging the lower end of said bar, said clips 14 encircling the lower part of member 1' and being connected with the bottom bars of the frame. A small gear 15 is journaled on a projection 16, carried by said angle bar, a chain wheel 17 is connected with said small gear. A chain 18 passes over this chain wheel and over the small chain wheel 11 on the hub of the rear wheel. 19 indicates a shiftable gear, located between the upper and lower gears 15 and 6. This gear 19 is of twice the thickness of the other gears and the gear 15 is out of alinement with the gear 7. In this way the gear 19 in one of its positions will connect the gear 6, which is secured to the crank, with the gear 15, so that the rotation of the crank will be communicated to the gear 15, and thus the bicycle will be driven through the chain 18 and the small chain wheel 11 on the hub of the rear wheel. In this position of the parts the gear 7 and the chain wheel 8 will idle on the crank so that the chain 9 will simply run on its wheels and thus not interfere with the action of the other wheels. When the gear 19 is in its other position it will connect the gear 6 with the gear 7 and it will be out of engagement with the gear 15. Thus the bicycle will be driven through the chain 9 on the chain wheel 10 while the wheel 15 will simply idle on its journal.

Any suitable means may be provided for shifting the gear 19. As shown, however, I provide a hand-operated lever 20, which is connected with the said gear by the link 21. In this way the gear 19 may be easily shifted by the cyclist from the seat.

By this invention the cyclist may propel the bicycle at high speed by means of the large gears and when he strikes a hill or a sandy road he may shift into lower speed.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a bicycle, the combination with the crank thereof, of a gear wheel secured to said crank, a second gear wheel loosely mounted on said crank, a chain wheel connected to said second gear wheel, a bar connected with the frame of the bicycle, an upper gear wheel carried by said bar, a chain wheel connected with said upper gear wheel, said upper gear-wheel being out of alinement with the lower gear wheels, large and small chain wheels on the hub of the rear wheel, a pair of chains connecting the chain wheels on the hub with the chain wheel on the crank and the chain wheel connected with the upper gear wheel, an intermediate gear wheel of double the thickness of the other gear wheels in mesh with the gear wheel secured to the crank and means for shifting said intermediate wheel into mesh with either the upper gear wheel or the second gear wheel on the crank.

In testimony whereof I affix my signature.

FRANK HERMAN BUBLITZ.